United States Patent
Busaba et al.

(10) Patent No.: US 9,710,278 B2
(45) Date of Patent: *Jul. 18, 2017

(54) OPTIMIZING GROUPING OF INSTRUCTIONS

(71) Applicant: International Business Machines Corporation, Armonk, NY (US)

(72) Inventors: Fadi Y. Busaba, Poughkeepsie, NY (US); Michael T. Huffer, Walden, NY (US); David S. Hutton, Tallahassee, FL (US); Edward T. Malley, New Rochelle, NY (US); John G. Rell, Jr., Saugerties, NY (US); Eric M. Schwarz, Gardiner, NY (US); Aaron Tsai, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/501,578

(22) Filed: Sep. 30, 2014

(65) Prior Publication Data

US 2016/0092214 A1   Mar. 31, 2016

(51) Int. Cl.
*G06F 15/76* (2006.01)
*G06F 15/00* (2006.01)
(Continued)

(52) U.S. Cl.
CPC .......... *G06F 9/3836* (2013.01); *G06F 9/3016* (2013.01); *G06F 9/382* (2013.01); *G06F 9/3853* (2013.01)

(58) Field of Classification Search
None
See application file for complete search history.

(56) References Cited

U.S. PATENT DOCUMENTS 5,509,130 A    4/1996  Trauben et al.
5,689,672 A *  11/1997 Witt .................... G06F 9/30152
                                                711/118

(Continued)

OTHER PUBLICATIONS

List of IBM patents or patent applications treated as related—Date Filed: Sep. 1, 2015; 2 pages.

(Continued)

*Primary Examiner* — Michael Sun
(74) *Attorney, Agent, or Firm* — Cantor Colburn LLP; Margaret A. McNamara (57) ABSTRACT

Embodiments include optimizing the grouping of instructions in a microprocessor. Aspects include receiving a first clump of instructions from a streaming buffer, pre-decoding each of instructions for select information and sending the instructions to an instruction queue. Aspects further include storing initial grouping information for the instructions in a local register, wherein the initial grouping information is based on the select information. Aspects further include updating the initial group information stored in the local register when additional pre-decode information becomes available and grouping the instructions that are ready to be dispatched into a dispatch group based on the grouping information stored in the local register. Aspects further include dispatching the dispatch group to an issue unit.

12 Claims, 4 Drawing Sheets

(51) Int. Cl.
  *G06F 9/38* (2006.01)
  *G06F 9/30* (2006.01)

(56) References Cited

U.S. PATENT DOCUMENTS

| | | | | |
|---|---|---|---|---|
| 5,742,783 | A * | 4/1998 | Azmoodeh | G06F 9/3822 |
| | | | | 712/212 |
| 5,796,973 | A * | 8/1998 | Witt | G06F 9/30149 |
| | | | | 712/204 |
| 5,809,273 | A * | 9/1998 | Favor | G06F 9/30152 |
| | | | | 712/210 |
| 6,134,649 | A * | 10/2000 | Witt | G06F 9/30021 |
| | | | | 711/E12.043 |
| 6,141,742 | A * | 10/2000 | Favor | G06F 9/30152 |
| | | | | 711/218 |
| 6,195,744 | B1 * | 2/2001 | Favor | G06F 7/74 |
| | | | | 712/215 |
| 7,430,653 | B1 | 9/2008 | Tremblay | |
| 8,095,777 | B2 | 1/2012 | Blaner et al. | |
| 8,219,784 | B2 | 7/2012 | Ban et al. | |
| 2008/0148089 | A1 * | 6/2008 | Luick | G06F 9/3814 |
| | | | | 713/600 |
| 2012/0047352 | A1 | 2/2012 | Yamana | |

OTHER PUBLICATIONS

U.S. Appl. No. 14/841,805, filed Sep. 1, 2015; Entitled: "Optimizing Grouping of Instructions".

\* cited by examiner

OPTIMIZING GROUPING OF INSTRUCTIONS

BACKGROUND

The present invention generally relates to microprocessors, and more specifically, to optimizing the grouping of instructions in a microprocessor.

In modern microprocessors, all instructions need information to be decoded and relayed to the execution units. Throughout this process there are many areas that can cause performance degradation. One such area of performance loss is the grouping stage. Grouping is the process of determining which instructions can be dispatched together. In general, the overall performance of a microprocessor is directly impacted by the number of instructions that can be grouped together and dispatched on a given cycle. As a result, generating and implementing effective grouping rules as quickly and efficiently as possible is desired.

SUMMARY

Embodiments include a computer system for optimizing the grouping of instructions in a microprocessor. The computer system includes a server having a processor, the processor configured to perform a method. The method includes receiving a first clump having a plurality of instructions from a streaming buffer, pre-decoding each of the plurality of instructions in the first clump for a select information and sending the plurality of instructions to an instruction queue and storing one or more of the plurality of instructions in a local register and storing an initial grouping information for each of the plurality of instructions in a local register, wherein the initial grouping information is based on the select information. Based on receiving an indication from the instruction queue that one or more of the plurality of instructions is ready to be dispatched from the instruction queue, the method includes determining if an additional pre-decode information is available. Based on determining that the additional pre-decode information is not available, the method includes grouping the one or more of the plurality of instructions that are ready to be dispatched from the instruction queue into a dispatch group based on the initial grouping information stored in the local register. Based on determining that the additional pre-decode information is available, the method includes updating the initial group information stored in the local register based on the additional pre-decode information and grouping the one or more of the plurality of instructions that are ready to be dispatched from the instruction queue into the dispatch group based on the updated grouping information stored in the local register. The method further includes dispatching the dispatch group to an issue unit.

Embodiments also include a computer program product for optimizing the grouping of instructions in a microprocessor, the computer program product including a computer readable storage medium having computer readable program code embodied therewith, the computer readable program code configured to perform a method. The method includes receiving a first clump having a plurality of instructions from a streaming buffer, pre-decoding each of the plurality of instructions in the first clump for a select information and sending the plurality of instructions to an instruction queue and storing one or more of the plurality of instructions in a local register and storing an initial grouping information for each of the plurality of instructions in a local register, wherein the initial grouping information is based on the select information. Based on receiving an indication from the instruction queue that one or more of the plurality of instructions is ready to be dispatched from the instruction queue, the method includes determining if an additional pre-decode information is available. Based on determining that the additional pre-decode information is not available, the method includes grouping the one or more of the plurality of instructions that are ready to be dispatched from the instruction queue into a dispatch group based on the initial grouping information stored in the local register. Based on determining that the additional pre-decode information is available, the method includes updating the initial group information stored in the local register based on the additional pre-decode information and grouping the one or more of the plurality of instructions that are ready to be dispatched from the instruction queue into the dispatch group based on the updated grouping information stored in the local register. The method further includes dispatching the dispatch group to an issue unit.

Embodiments further include a method for optimizing the grouping of instructions in a microprocessor. The method includes receiving a first clump having a plurality of instructions from a streaming buffer, pre-decoding each of the plurality of instructions in the first clump for a select information and sending the plurality of instructions to an instruction queue and storing one or more of the plurality of instructions in a local register and storing an initial grouping information for each of the plurality of instructions in a local register, wherein the initial grouping information is based on the select information. Based on receiving an indication from the instruction queue that one or more of the plurality of instructions is ready to be dispatched from the instruction queue, the method includes determining if an additional pre-decode information is available. Based on determining that the additional pre-decode information is not available, the method includes grouping the one or more of the plurality of instructions that are ready to be dispatched from the instruction queue into a dispatch group based on the initial grouping information stored in the local register. Based on determining that the additional pre-decode information is available, the method includes updating the initial group information stored in the local register based on the additional pre-decode information and grouping the one or more of the plurality of instructions that are ready to be dispatched from the instruction queue into the dispatch group based on the updated grouping information stored in the local register. The method further includes dispatching the dispatch group to an issue unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Methods and systems for optimizing the grouping of instructions in a microprocessor are provided. In exemplary embodiments, raw data is received by a streaming buffer which parses the raw data into clumps of instructions. These clumps of instructions are then sent to both an instruction queue and to a pre-decode unit, which determines which instructions should be grouped before being dispatched to an issue unit of the microprocessor. In one embodiment, the clumps of instructions include up to six instructions and each dispatch group includes up to three instructions. In exemplary embodiments, the grouping of the instructions is preformed across the clumps of instructions provided by the streaming buffer. In other words, a dispatch group may include instructions that were received in different clumps of instructions.

In an embodiment with a maximum group size of three instructions, the pre-decode unit is configured to look ahead at the next two instructions and to determine if it is possible to group them together. However, it is possible that two or three instructions that can be grouped together will not be predecoded during the same cycle. For example, the instructions may be received from the streaming buffer in separate clumps. Accordingly, the pre-decode unit may make initial grouping decisions based on conservative assumptions and may revise these grouping decisions when additional instructions are received.

Figure 1:
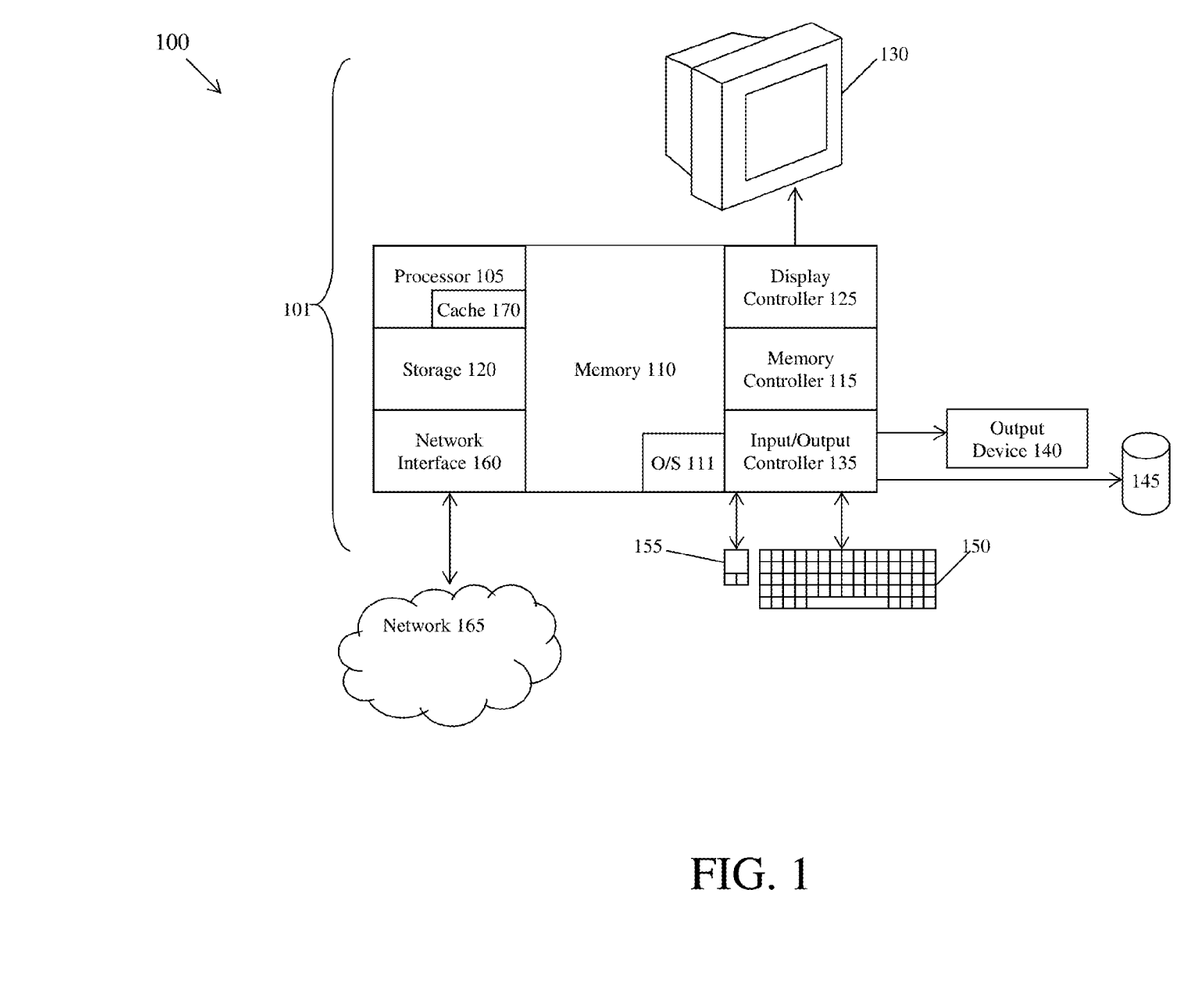
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

Figure 2:
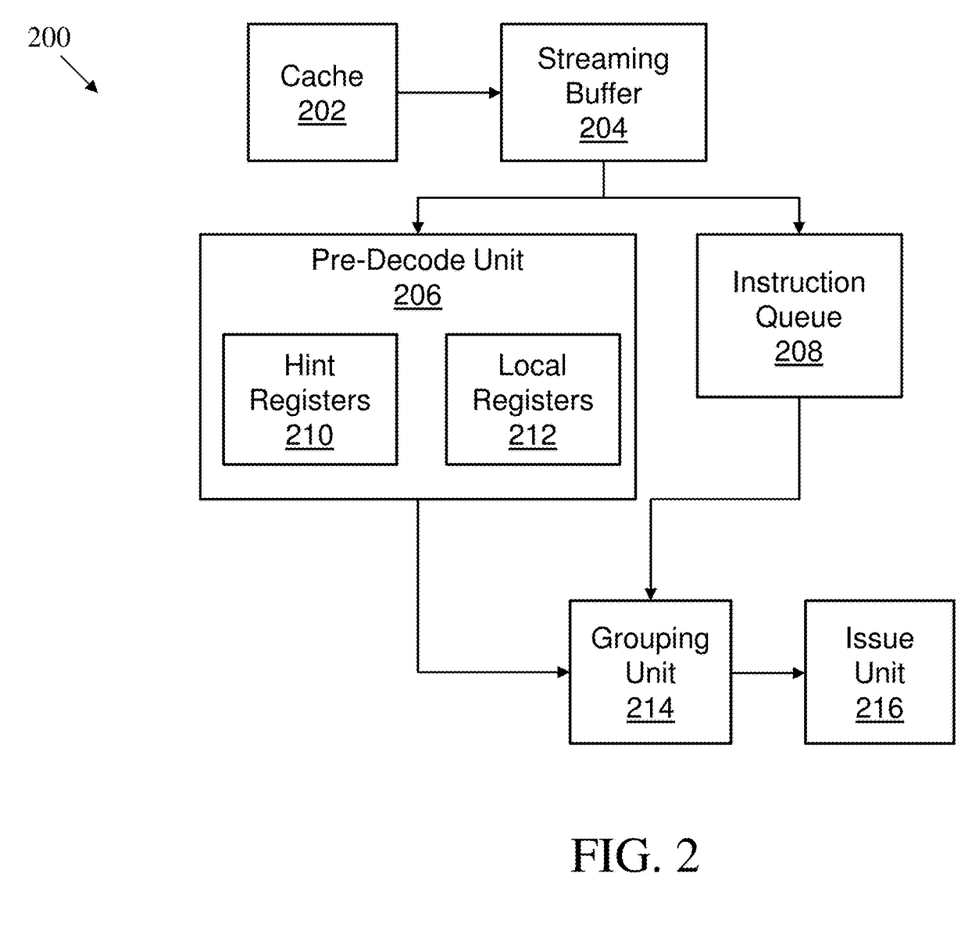
FIG. 2 illustrates a block diagram of a system for optimizing the grouping of instructions in a microprocessor in accordance with an embodiment.

Referring now to FIG. 2, a block diagram of a system 200 for optimizing the grouping of instructions in a microprocessor in accordance with an embodiment is shown. As illustrated, the system 200 includes a streaming buffer 204 which receives raw data from a cache 202. In exemplary embodiments, the streaming buffer 204 forms clumps of instructions from the raw data received from the cache 202. The size of the clumps of instructions may be determined based on a size of a pipeline, or communications link, between the streaming buffer 204 and an instruction queue 208. Once the clumps are formed by the streaming buffer 204, the clumps are sent to both instruction queue 208 and to a pre-decode unit 206. In exemplary embodiments, the instruction queue 208 is configured to store the instructions until the instructions are ready to be grouped and dispatched to an issue unit 216. In exemplary embodiments, the instructions are dispatched to an issue unit 216 in a dispatch group having a maximum number of instructions that may be based on the type of the issue unit 216.

In exemplary embodiments, the pre-decode unit 206 interprets the instructions in the clump and generates initial grouping information that will be used to group the instructions. In exemplary embodiments, the pre-decode unit 206 utilizes hint registers 210 to store pre-decode logic and local registers 212 to store the grouping information. The local registers 212 are configured to store the grouping information for the instruction until the instructions are ready to be dispatched to the issue unit 216. In exemplary embodiments, the local registers 212 are configured to store grouping information for instructions across more than one clump. For example, if a clump includes six instructions, the local registers 212 may be able to store grouping information for seven or more instructions. In exemplary embodiments, the grouping unit 214 interprets grouping rules stored in the hint registers 210, updates the grouping information stored in the local registers 212 if possible, and dispatches the grouped instructions to one or more issue units 216.

In exemplary embodiments, the initial grouping information created by the pre-decode unit 206 is speculative and is not always correct or complete. One reason that the initial grouping information is speculative is that there are many rules that determine grouping. In addition, for various reasons all of grouping rules may not be known during the pre-decode phase. For these reasons, the pre-decode unit 206 is configured to take a pessimistic view, or to assume worst case scenario, when creating the initial grouping information. In exemplary embodiments, the pessimistic view may include assuming that an instruction either ends a group or groups alone. For example, if an instruction is tagged as "ends a group" then no instruction may follow that instruction in the group in the same cycle. Likewise an instruction that is set as "groups alone" must be the only instruction in the group.

In exemplary embodiments, the initial grouping information created by the pre-decode unit 206 can updated or modified by the grouping unit 214. Once instructions are available from the instruction queue, the grouping information stored in the local registers 212 can be re-written. For example, if initial grouping information assumed that an instruction ends a group and it turns out that the instruction does not end a group, the grouping can be updated.

In general, when instructions pass through the pre-decode unit 206, it is impossible for the last and next to last instruction in a clump to get a full picture of their grouping scenario due to the fact that one (in the case of the next to last instruction) or more (in the case of the last instruction) subsequent instructions are unavailable. In exemplary embodiments, the initial grouping information for these instructions assumes the worst case scenario, i.e., no other instructions are available and we will potentially have empty slots in a dispatch group). At the same time, at least some of the grouping information for these instructions is stored in local registers 212 used by the pre-decode unit 204 for use later.

Once the next set of pre-decodes are available (i.e., after the next clump of instructions is received and processed by the pre-decode unit) it is possible to update the grouping information for the previous instructions. Accordingly, if an instruction was pre-decoded in the previous cycle with stringent grouping rules (i.e., must group alone), and was not consumed (i.e., grouped and dispatched to the issue unit 216) during the last cycle, the current cycle will have this information and may update the grouping information. In addition, if it is determined that there are empty slots available in a previously calculated dispatch group, then the hint registers 210 can be rewritten with a new grouping rule to fill the available slots in the dispatch group.

In exemplary embodiments, during every processing cycle, the hint registers 210 are written with information from all of the instructions pre-decoded in the clump. In addition, the pre-decode unit 206 stores local data for at least the last two instructions in the clump in the local registers 212. The data stored in the hint registers 210 and the local registers 212 is easily accessible by the pre-decode unit 206, and is used to re-evaluate the previous cycle's grouping decisions. In exemplary embodiments, only a small amount of data may be stored for the second to last instruction while a larger amount is stored for the last instruction because the last instruction can have up to two instructions follow it in the next cycle.

In exemplary embodiments, the grouping rules can only restrict the number of instructions dispatched and if the last instruction of the previous cycle has two instructions following it then the grouping unit needs to know all of its restrictions. Even though information is stored for the last two instructions in a clump, these last two instructions may not be used in the next cycle's grouping rules. It is possible for all the instructions in a clump to be consumed in a single cycle. If for any reason the information in the hint registers 210 is no longer useful they can be overwritten. If the hint registers 210 are overwritten then the new information will be used for the grouping rules in the current cycle.

Figure 3:
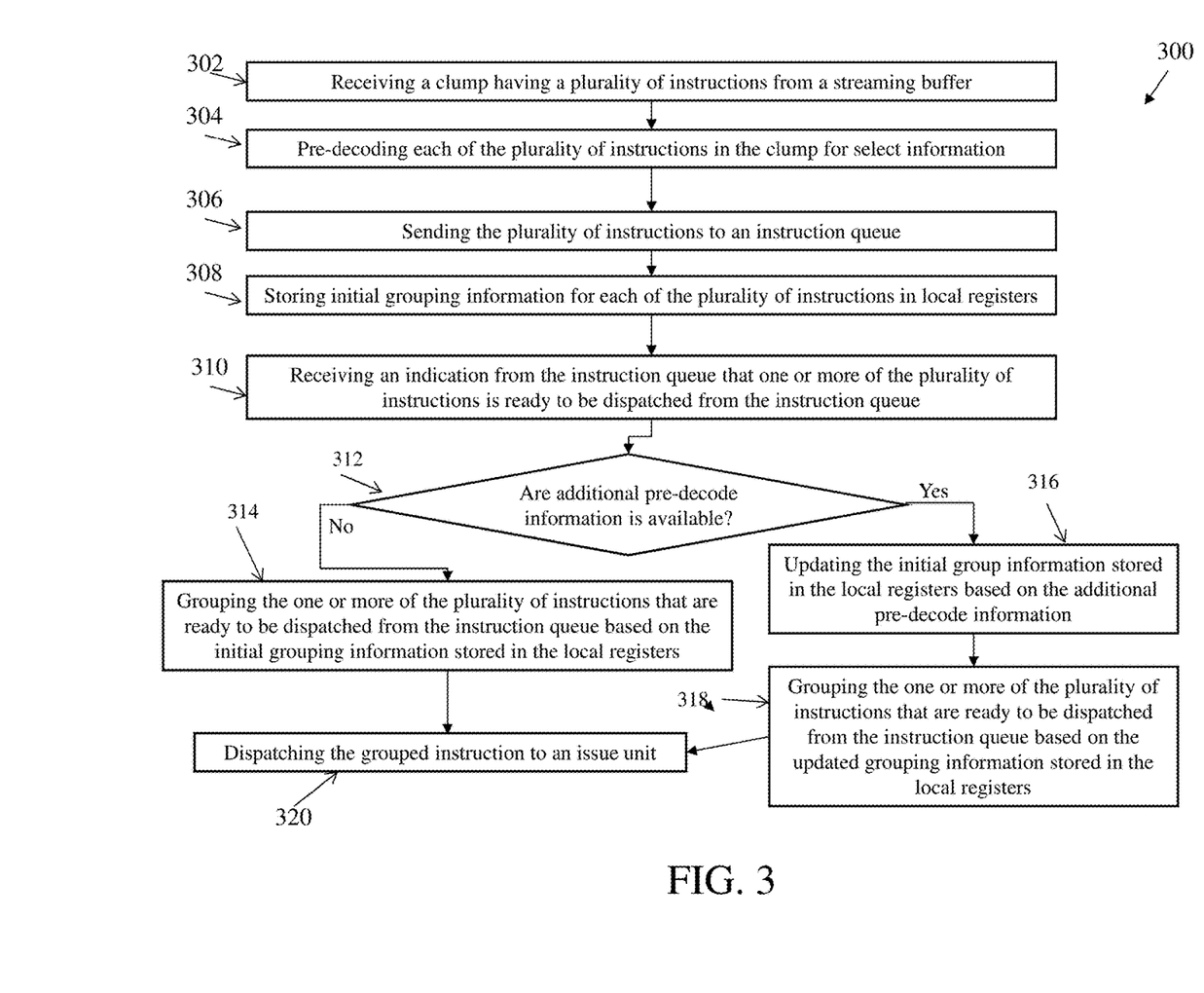
FIG. 3 illustrates a flow diagram of a method optimizing the grouping of instructions in a microprocessor in accordance with an embodiment.

Referring now to FIG. 3, a flowchart diagram of a method 300 optimizing the grouping of instructions in a microprocessor in accordance with an embodiment is shown. As shown at block 302, the method 300 includes receiving a clump having a plurality of instructions from a streaming buffer. Next, as shown at block 304, the method 300 includes pre-decoding each of the plurality of instructions in the clump for select information. The method 300 also includes sending the plurality of instructions to an instruction queue, as shown at block 306. Next, as shown at block 308, the method 300 includes storing initial grouping information for each of the plurality of instructions in local registers. In exemplary embodiments, the initial grouping information for each of the plurality of instructions is based on worst case grouping scenario.

Continuing with reference to FIG. 3, the method 300 also includes receiving an indication from the instruction queue that one or more of the plurality of instructions is ready to be dispatched from the instruction queue, as shown at block 310. Next, as shown at decision block 312, the method 300 includes determining if additional pre-decode information is available. If additional pre-decode information is not available, the method 300 proceeds to block 314 and the one or more of the plurality of instructions that are ready to be dispatched from the instruction queue are grouped based on the initial grouping information. If additional pre-decode information is available, the method 300 proceeds to block 316 and updates the initial group information stored in the local register based on the additional pre-decode information. Next, as shown at decision block 318, the method 300 includes grouping the one or more of the plurality of instructions that are ready to be dispatched from the instruction queue based on the updated grouping information stored in the local register. The method 300 also includes dispatching the grouped instruction to an issue unit, as shown at block 320.

Figure 4:
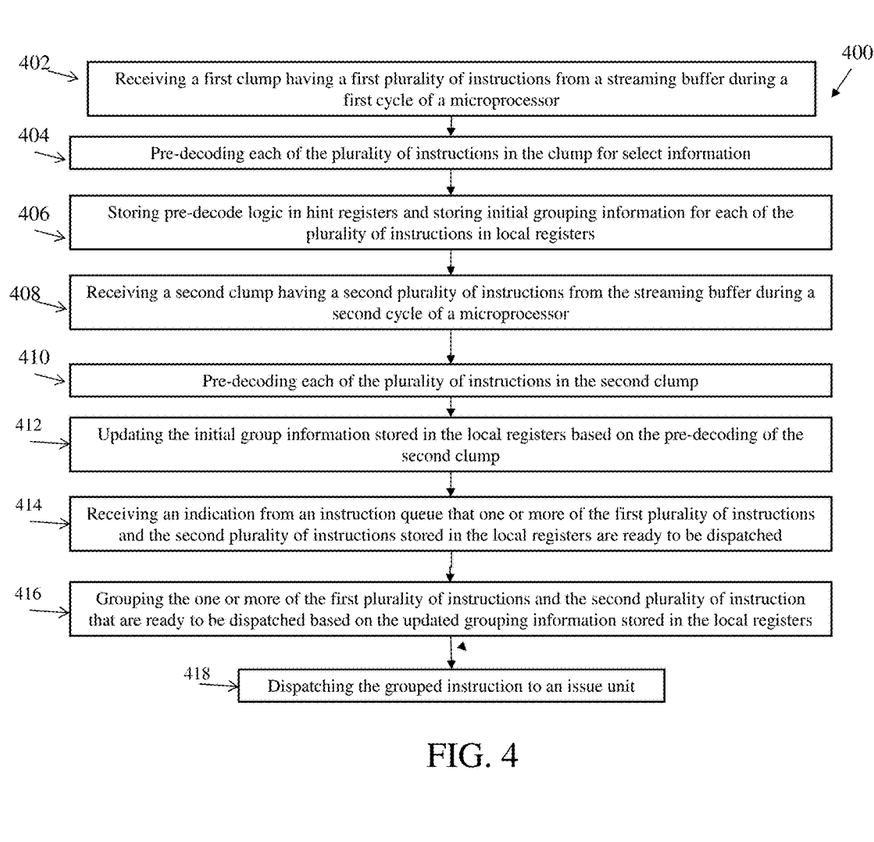
FIG. 4 illustrates a flow diagram of another method for optimizing the grouping of instructions in a microprocessor in accordance with an embodiment.

Referring now to FIG. 4, a flowchart diagram of a method 400 for optimizing the grouping of instructions in a microprocessor in accordance with an embodiment is shown. As shown at block 402, the method 400 includes receiving a first clump having a first plurality of instructions from a streaming buffer during a first cycle of a microprocessor. Next, as shown at block 404, the method 400 includes pre-decoding each of the plurality of instructions in the clump for select information. The method 400 also includes storing pre-decode logic in hint registers and storing initial grouping information for each of the plurality of instructions in local registers, as shown at block 406. Next, as shown at block 408, the method 400 includes receiving a second clump having a second plurality of instructions from the streaming buffer during a second cycle of a microprocessor. The method 400 also includes pre-decoding each of the plurality of instructions in the second clump, as shown at block 410.

Next, as shown at block 412, the method 400 includes updating the initial group information stored in the local registers based on the pre-decoding of the second clump. The method 400 also includes receiving an indication from an instruction queue that one or more of the first plurality of instructions and the second plurality of instructions stored in the local registers are ready to be dispatched, as shown at block 414. Next, as shown at block 416, the method 400 includes grouping the one or more of the first plurality of instructions and the second plurality of instruction that are ready to be dispatched based on the updated grouping information stored in the local registers. The method 400 also includes dispatching the grouped instruction to an issue unit, as shown at block 418.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A computer system for optimizing the grouping of instructions in a microprocessor, the computer system comprising:
   a server having a processor, the processor configured to perform a method comprising:
      receiving a first clump having a plurality of instructions from a streaming buffer;
      pre-decoding each of the plurality of instructions in the first clump for a select information and sending the plurality of instructions to an instruction queue;
      storing one or more of the plurality of instructions in a local register and storing an initial grouping information for each of the plurality of instructions in a local register, wherein the initial grouping information is based on the select information, wherein the initial grouping information for each of the plurality of instructions is based on worst case grouping scenario;
      based on receiving an indication from the instruction queue that one or more of the plurality of instructions is ready to be dispatched from the instruction queue, determining if an additional pre-decode information is available;
      based on determining that the additional pre-decode information is not available, grouping the one or more of the plurality of instructions that are ready to be dispatched from the instruction queue into a dispatch group based on the initial grouping information stored in the local register;
      based on determining that the additional pre-decode information is available, updating the initial group information stored in the local register based on the additional pre-decode information and grouping the one or more of the plurality of instructions that are ready to be dispatched from the instruction queue into the dispatch group based on the updated grouping information stored in the local register; and
      dispatching the dispatch group to an issue unit.

2. The system of claim 1, wherein the dispatch group comprises three or less of the plurality of instructions that are ready to be dispatched from the instruction queue.

3. The system of claim 1, wherein the first clump of instructions is received during a first cycle of the microprocessor and a second clump of instructions having a second plurality of instructions is received from the streaming buffer during a second cycle of the microprocessor.

4. The system of claim 3, wherein the determination that the additional pre-decode information is available is based off of pre-decoding each of the second plurality of instructions in the second clump.

5. The system of claim 4, wherein the dispatch group comprises at least one of the first plurality of instruction and at least one of the second plurality of instructions.

6. The system of claim 3, wherein updating the initial group information includes adding one or more instructions form the second clump to the dispatch group.

7. A computer program product for optimizing the grouping of instructions in a microprocessor, the computer program product comprising:
- a computer readable storage medium having computer readable program code embodied therewith, the computer readable program code comprising:
- computer readable program code configured for:
- receiving a first clump having a plurality of instructions from a streaming buffer;
- pre-decoding each of the plurality of instructions in the first clump for a select information and sending the plurality of instructions to an instruction queue;
- storing one or more of the plurality of instructions in a local register and storing an initial grouping information for each of the plurality of instructions in a local register, wherein the initial grouping information is based on the select information;
- based on receiving an indication from the instruction queue that one or more of the plurality of instructions is ready to be dispatched from the instruction queue, determining if an additional pre-decode information is available;
- based on determining that the additional pre-decode information is not available, grouping the one or more of the plurality of instructions that are ready to be dispatched from the instruction queue into a dispatch group based on the initial grouping information stored in the local register;
- based on determining that the additional pre-decode information is available, updating the initial group information stored in the local register based on the additional pre-decode information and grouping the one or more of the plurality of instructions that are ready to be dispatched from the instruction queue into the dispatch group based on the updated grouping information stored in the local register; and
- dispatching the dispatch group to an issue unit.

8. The computer program product of claim 7, wherein the dispatch group comprises three or less of the plurality of instructions that are ready to be dispatched from the instruction queue.

9. The computer program product of claim 7, wherein the first clump of instructions is received during a first cycle of the microprocessor and a second clump of instructions having a second plurality of instructions is received from the streaming buffer during a second cycle of the microprocessor.

10. The computer program product of claim 9, wherein the determination that the additional pre-decode information is available is based off of pre-decoding each of the second plurality of instructions in the second clump.

11. The computer program product of claim 10, wherein the dispatch group comprises at least one of the first plurality of instruction and at least one of the second plurality of instructions.

12. The computer program product of claim 9, wherein updating the initial group information includes adding one or more instructions form the second clump to the dispatch group.

* * * * *